US006420042B1

(12) United States Patent
Sakamoto et al.

(10) Patent No.: US 6,420,042 B1
(45) Date of Patent: Jul. 16, 2002

(54) FE-BASED AMORPHOUS ALLOY THIN STRIP WITH ULTRATHIN OXIDE LAYER

(75) Inventors: Hiroaki Sakamoto; Toshio Yamada; Yoshiharu Inoue, all of Futtsu (JP)

(73) Assignee: Nippon Steel Corporation, Tokyo (JP)

( * ) Notice: Subject to any disclaimer, the term of this patent is extended or adjusted under 35 U.S.C. 154(b) by 0 days.

(21) Appl. No.: 09/405,341

(22) Filed: Sep. 24, 1999

(51) Int. Cl.[7] .................. B32B 15/04; B32B 15/18; B32B 9/00
(52) U.S. Cl. .............. 428/469; 428/472; 428/701; 428/702; 428/607
(58) Field of Search .................. 428/469, 472, 428/701, 702, 607

(56) References Cited

U.S. PATENT DOCUMENTS 4,487,812 A * 12/1984 Kawasaki et al. .......... 428/629
4,504,327 A * 3/1985 Inomata et al. ........... 148/31.55

FOREIGN PATENT DOCUMENTS

| JP | 59-150081 | 8/1984 |
| JP | 61-250162 | 11/1986 |
| JP | 2-4913 | 1/1990 |
| JP | 6-346219 | 12/1994 |

* cited by examiner

*Primary Examiner*—Deborah Jones
*Assistant Examiner*—Andrew Piziali
(74) *Attorney, Agent, or Firm*—Kenyon & Kenyon

(57) ABSTRACT

The present invention provides a low iron-loss Fe-based amorphous alloy thin strip having an ultrathin oxide layer with a controlled thickness and/or a segregated layer containing either or both P and S at the lower section of an ultrathin oxide layer, as well as an Fe-based amorphous alloy thin strip fabricated with an ultrathin oxide layer with a controlled structure on the thin strip surface, wherein the ultrathin oxide layer is formed with a two-layer structure on the thin strip surface to reduce iron loss. Specifically, there is provided an Fe-based amorphous alloy thin strip characterized by being a quenched metal thin strip obtained by ejecting a molten metal onto a moving substrate through a casting nozzle with a slot-shaped opening and quenching it to solidity, and by having ultrathin oxide layer with a thickness of from 5 nm to 20 nm on at least one surface of the thin strip. There is further provided an Fe-based amorphous alloy thin strip characterized by being a quenched metal thin strip obtained by ejecting a molten metal onto a moving substrate through a casting nozzle with a slot-shaped opening and quenching it to solidity, by having an ultrathin oxide layer on at least one surface of the thin strip, and by having a segregated layer containing either or both P and S at the lower section of the oxide layer.

10 Claims, 10 Drawing Sheets

1mm

1mm

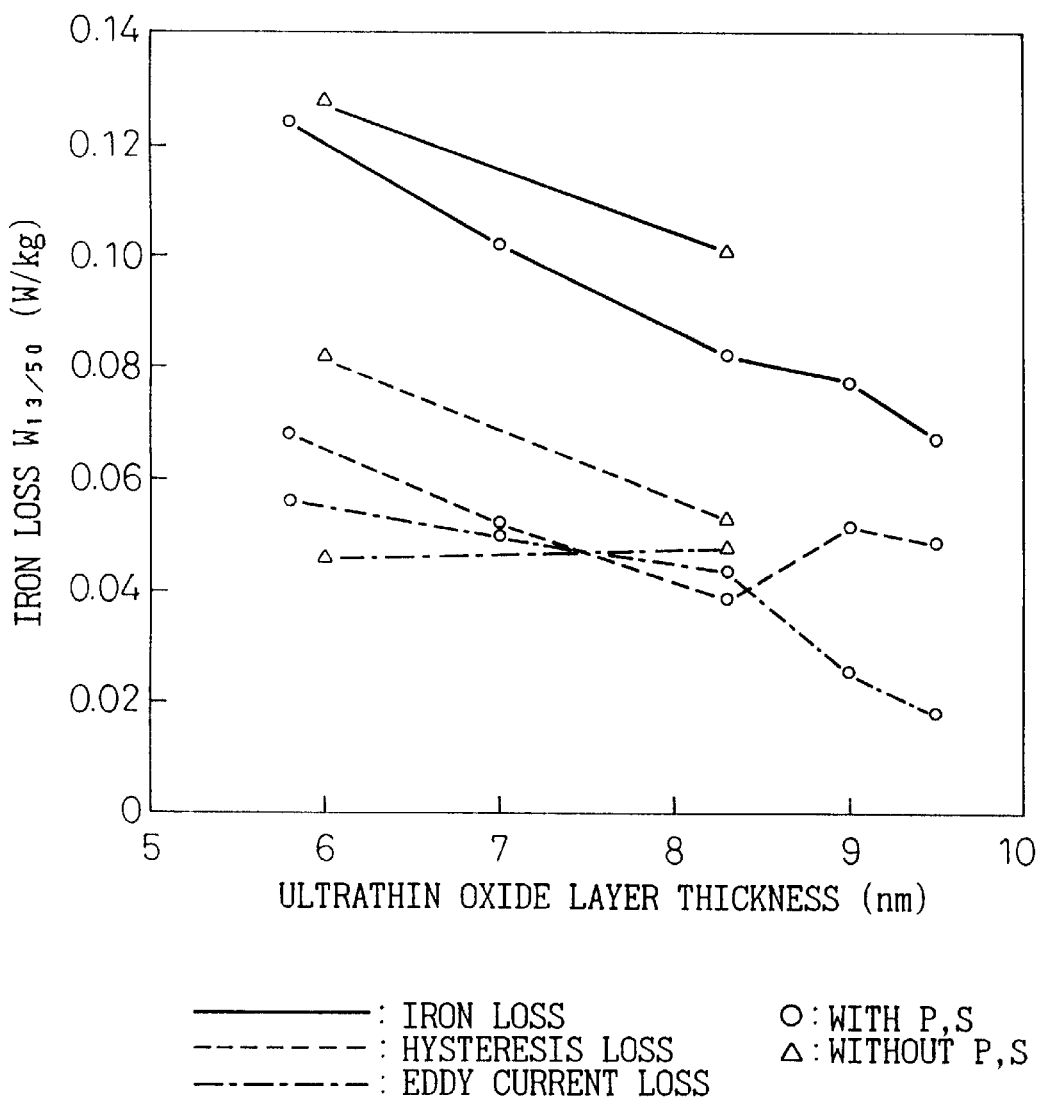

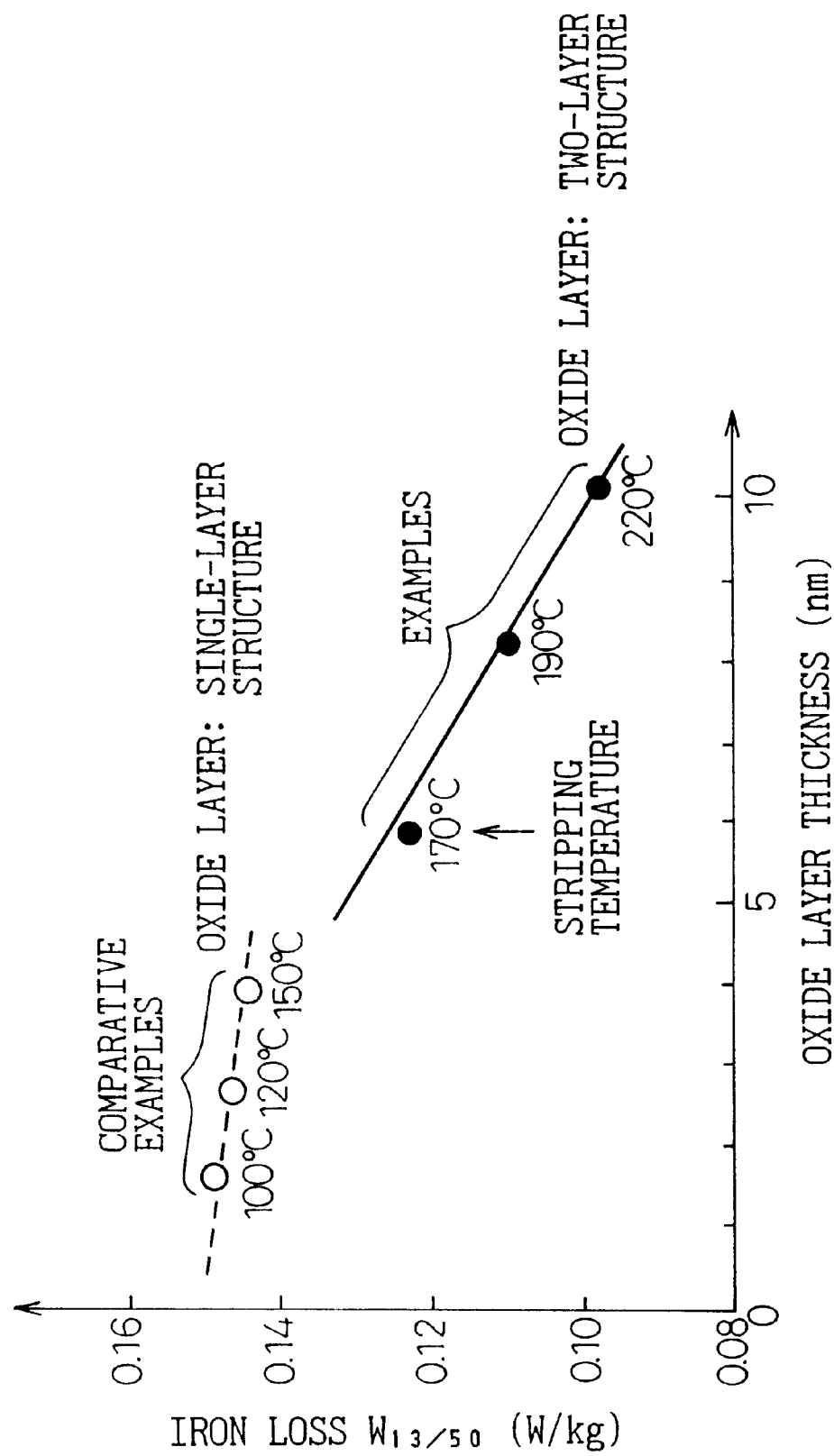

FE-BASED AMORPHOUS ALLOY THIN STRIP WITH ULTRATHIN OXIDE LAYER

BACKGROUND OF THE INVENTION

1. Field of the Invention

The present invention relates to an Fe-based amorphous alloy thin strip used for iron core materials in power transformers, high-frequency transformers and the like.

2. Description of the Related Art

Amorphous alloy thin strips are obtained by quenching alloys from their molten state. Known methods for manufacturing thin strips include centrifugal quenching, the single-roll method and the twin-roll method. These methods produce thin strips or wires by ejecting a molten metal from an orifice onto the inner or outer perimeter side of a metal drum rotating at high-speed to thus rapidly solidify the molten metal. Amorphous alloy thin strips with excellent electromagnetic properties, mechanical properties or corrosion resistance can also be obtained by appropriately selecting the alloy composition.

Because of these excellent properties, such amorphous alloy thin strips are promising as industrial materials for a wide variety of uses. Among them, Fe-based amorphous alloy thin strips, such as Fe—Si—B ternary alloy, etc., are being employed as iron core materials for power transformers and high frequency transformers because of their low iron loss and high saturation magnetic flux density and magnetic permeability.

Amorphous alloy thin strips with insulating coatings are the most often proposed alternatives aimed at improving the electromagnetic properties of iron core materials. Insulating coatings have the effect of increasing interlayer insulating properties and reducing eddy current loss produced by cross-over flux, in transformer magnetic cores fabricated by layering coiled amorphous alloy thin strips. The following method has been disclosed in the prior art as a means of increasing interlayer insulation in Fe-based amorphous alloy thin strips used for iron core materials. This method (Japanese Unexamined Patent Publication No. 6-346219) increases interlayer insulation and improves magnetic permeability when a toroidal core is made, by introducing oxygen at 20% or less during the heat treatment step for the thin strip to form an oxide film-on the thin strip surface at from a few tens of nanometers to 100 nm; however, the resulting oxide layer thickness is too large and a sufficient improvement in iron loss cannot be achieved.

On the other hand, the following method has also been disclosed for the purpose of imparting stress to thin strips to improve iron loss, etc. In this method (Japanese Unexamined Patent Publication No. 61-250162), heat treatment is carried out in a mixed atmosphere of an inert gas and oxygen in order to form an oxide film layer to a thickness of 20–300 nm on the thin strip surface to impart compressive stress in the direction parallel to the surface of the thin strip; however, the oxide layer is too thick and a sufficient improvement in iron loss cannot be achieved by this method.

Other methods have also been disclosed which focus on the oxides on the thin strip surface, aimed at obtaining other effects. According to one method (Japanese Unexamined Patent Publication No. 2-4913) involving annealing of an alumina insulating film-equipped iron-based amorphous alloy thin strip obtained by baking with an aqueous treatment solution composed mainly of a colloidal alumina hydrate, oxidation of B is avoided and crystallization of the thin strip surface is prevented by introducing oxygen into the annealing atmosphere to form an oxide film of Si on the thin strip surface, while another method (Japanese Unexamined Patent Publication No. 59-150081) forms an oxide of Ti, Zr, Cr, Al or Si or a nitride of Al or Si on an amorphous material surface by vapor deposition to a thickness of 10 nm –3.7 $\mu$m, to improve the abrasion resistance.

Thus, while the prior art techniques give thin strips having oxide layers formed on the thin strip surfaces for the purpose of improving iron loss of the thin strips, the thickness of the oxide layers cannot be adequately controlled, and therefore adequate improvement in iron loss has not be achieved. Moreover, since the prior art techniques involve formation of oxide layers, they have required complicated surface treatment, etc.

SUMMARY OF THE INVENTION

It is an object of the present invention to provide a low iron-loss Fe-based amorphous alloy thin strip having an ultrathin oxide layer with a controlled thickness, and a low iron-loss Fe-based amorphous alloy thin strip with a segregated layer containing either or both P and S at the lower section of an ultrathin oxide layer with a controlled thickness.

It is another object of the invention to provide an Fe-based amorphous alloy thin strip fabricated with an ultrathin oxide layer in a controlled structure on the thin strip surface, wherein the ultrathin oxide layer is formed with a two-layer structure on the thin strip surface to reduce iron loss.

The gist of the invention is as follows.

(1) AnFe-based amorphous alloy thin strip characterized by being a quenched metal thin strip obtained by ejecting a molten metal onto a moving substrate through a casting nozzle with a slot-shaped opening and quenching it to solidity, and by having an ultrathin oxide layer with a thickness of from 5 nm to 20 nm on at least one surface of the thin strip.

(2) An Fe-based amorphous alloy thin strip characterized by being a quenched metal thin strip obtained by ejecting a molten metal onto a moving substrate through a casting nozzle with a slot-shaped opening and quenching it to solidity, by having an ultrathin oxide layer on at least one surface of the thin strip, and by having a segregated layer containing either or both P and S at the lower section of the oxide layer.

(3) An Fe-based amorphous alloy thin strip characterized by being a quenched metal thin strip obtained by ejecting a molten metal onto a moving substrate through a casting nozzle with a slot-shaped opening and quenching it to solidity and by having an ultrathin oxide layer on at least one surface of the thin strip, and in that the ultrathin oxide layer has a two-layer structure.

(4) An Fe-based amorphous alloy thin strip according to any one of (1), (2) or (3) above, characterized by having an ultrathin oxide layer on at least one surface of the thin strip, which is not in contact with the substrate.

(5) An Fe-based amorphous alloy thin strip according to either of (2) or (4) above, characterized in that the thickness of the segregated layer containing either or both P and S is 0.2 nm or greater.

(6) An Fe-based amorphous alloy thin strip according to either of (3) or (4) above, characterized in that the two layers of the ultrathin oxide layer with the two-layer structure are both amorphous oxide layers.

(7) An Fe-based amorphous alloy thin strip according to either of (3) or (4) above, characterized in that the first oxide layer on the outermost surface of the thin strip in the ultrathin oxide layer with the two-layer structure is a crystalline oxide and amorphous oxide mixed layer, and the second oxide layer between the first oxide layer and the amorphous mother phase is an amorphous oxide layer.

(8) An Fe-based amorphous alloy thin strip according to either of (3) or (4) above, characterized in that the first oxide layer on the outermost surface of the thin strip in the ultrathin oxide layer with the two-layer structure is a crystalline oxide layer, and the second oxide layer between the first oxide layer and the amorphous mother phase is an amorphous oxide layer.

(9) An Fe-based amorphous alloy.thin strip according to any one of (1), (2), (3), (4), (5), (6), (7) or (8) above, characterized in that the ultrathin oxide layer has a composition which is Fe-based, Si-based, B-based or a composite thereof.

(10) An Fe-based amorphous alloy thin strip according to any one of (7), (8) or (9) above, characterized in that the crystalline oxide composing the ultrathin oxide layer is an Fe-based oxide with a spinel structure.

(11) An Fe-based amorphous alloy thin strip according to any:one of (3), (4), (6), (7), (8), (9) or (10) above, characterized in that the total thickness of the ultrathin oxide layer with the two-layer structure is from 5 nm to 20 nm, the thickness of the first oxide layer on the uppermost surface of the thin strip is from 3 nm to 15 nm, and the thickness of the second oxide layer between the first oxide layer and the amorphous mother phase is from 2 nm to 10 nm.

(12) An Fe-based amorphous alloy thin strip according to any one of (3), (4), (6), (7), (8), (9) or (10) above, characterized in that at least one element from among P, As, Sb, Bi, S, Se and Te is segregated in the second oxide layer.

(13) An Fe-based amorphous alloy thin strip according to (12) above, characterized in that at least one element from among P, As, Sb, Bi, S, Se and Te is present in the thin strip at a total content of from 0.0003% to 0.15% by weight.

(14) An Fe-based amorphous alloy thin strip according to any one of (1), (2), (3), (4), (5), (6), (7), (8), (9), (10), (11), (12) or (13) above, characterized in that the sheet thickness of the thin strip is from 10 $\mu$m to 100 $\mu$m.

BRIEF DESCRIPTION OF THE DRAWINGS

FIG. 1($b$) is a magnetic domain observation photograph of an ultrathin oxide layer thickness of 7.0 nm, with a W13/50 (iron loss at 1.3 T and 50 Hz) of 0.097 W/kg and a magnetic domain width of 1.3 mm.

FIG. 2($b$) is a magnetic domain observation photograph of an ultrathin oxide layer thickness of 9.0 nm, with a W13/50 (iron loss at 1.3 T and 50 Hz) of 0.077 W/kg and a magnetic domain width of 0.5 mm.

FIG. 3 is a graph showing the relationship between the ultrathin oxide layer thickness and iron loss.

FIG. 8($b$) is a diffraction pattern showing the spinel structure of the first layer of the oxide layer.

FIG. 11 is a graph showing the relationship between the ultrathin oxide layer thickness and iron loss.

DESCRIPTION OF THE PREFERRED EMBODIMENT

The present invention will now be explained in greater detail.

The invention is characterized in that low iron loss can be achieved by an Fe-based amorphous alloy thin strip having an ultrathin oxide layer with a controlled thickness, and by an amorphous alloy thin strip having a segregated layer containing either or both P and S at the lower section of an ultrathin oxide layer with a controlled thickness.

Figure 1A:
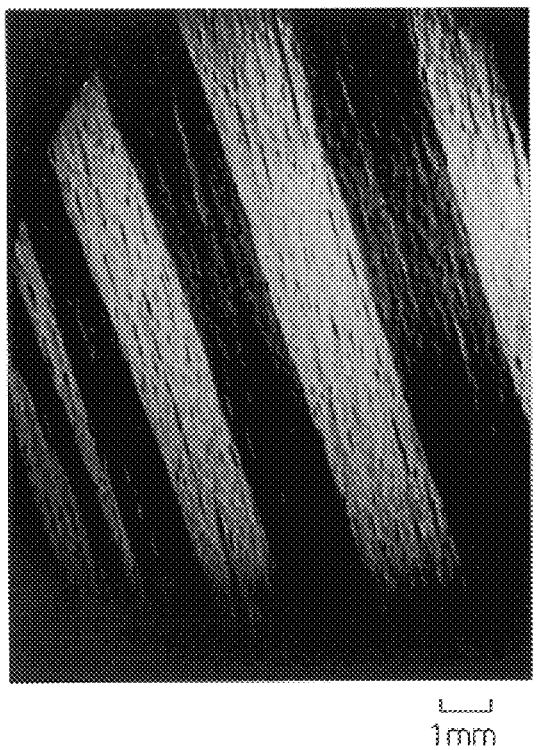
FIG. 1($a$) is a magnetic domain observation photograph of an ultrathin oxide layer thickness of 5.8 nm, with a W13/50 (iron loss at 1.3 T and 50 Hz) of 0.127 W/kg and a magnetic domain width of 1.7 mm.
Figure 1B:
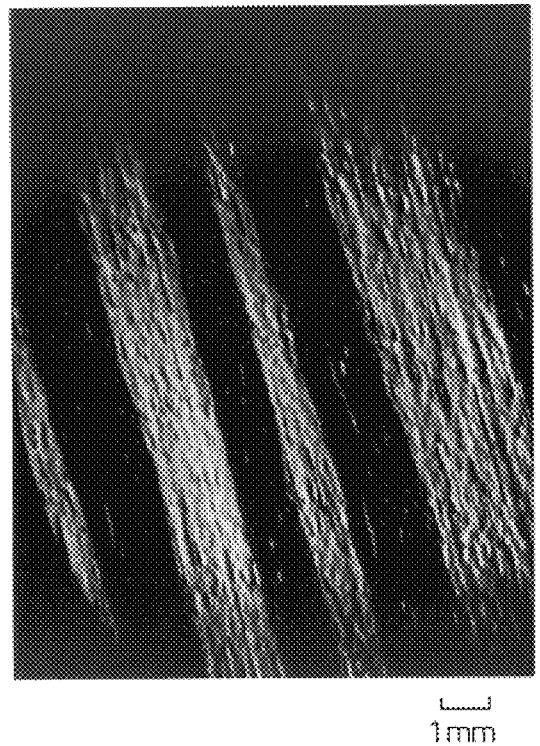
Figure 2A:
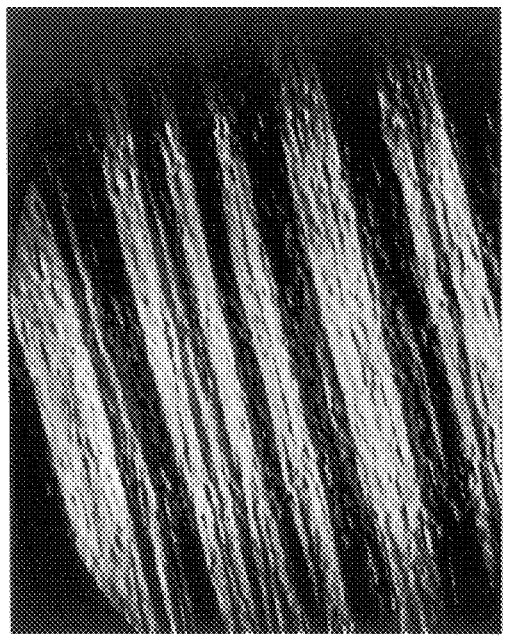
FIG. 2($a$) is a magnetic domain observation photograph of an ultrathin oxide layer thickness of 8.3 nm, with a W13/50 (iron loss at 1.3 T and 50 Hz) of 0.080 W/kg and a magnetic domain width of 0.8 mm.
Figure 2B:
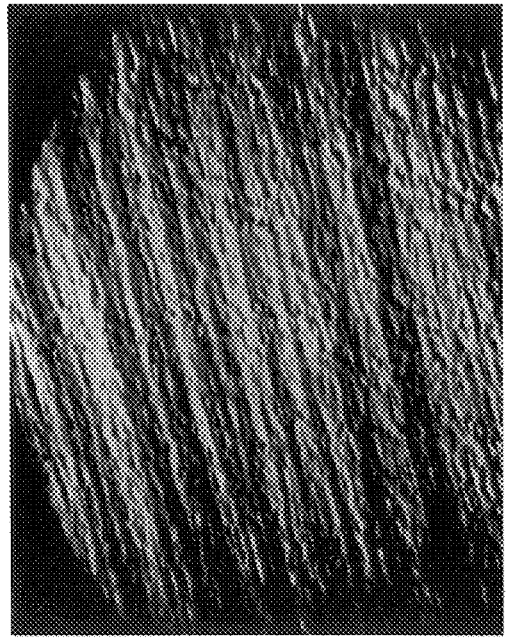

An oxide layer is formed on the thin strip surface during the process of casting the amorphous alloy thin strip in air. The thickness of the oxide layer changes depending on the thin strip temperature and the atmosphere near the thin strip. The present inventors have found that a very thin oxide layer on the thin strip surface has an effect on iron loss. FIG. 1($a$), FIG. 1($b$), FIG. 2($a$) and FIG. 2($b$) show magnetic domains photographed by the SEM method, which demonstrate iron loss for thin strips with a controlled ultrathin oxide layer thickness obtained by changing the lift-off temperature of the strip and the oxygen concentration in the atmosphere, in an Fe—Si—B—C (P,S) system. FIG. 1($a$) shows the magnetic domain state with an ultrathin oxide layer thickness of 5.8 nm, FIG. 1(b) shows it with an ultrathin oxide layer thickness of 7.0 nm, FIG. 2(a) shows it with an ultrathin oxide layer thickness of 8.3 nm, and FIG. 2(b) shows it with an ultrathin oxide layer thickness of 9.0 nm. FIG. 1(a), FIG. 1(b), FIG. 2(a) and FIG. 2(b) clearly show that as the oxide layer thickness increases, the magnetic domain becomes fragmented and iron loss is reduced.

The present inventors also investigated the relationship between the ultrathin oxide layer thickness and the hysteresis loss and eddy current loss obtained by iron loss separation, for Fe—Si—B—C-based and Fe—Si—B—C—(P,S)-based amorphous alloy thin strips having different ultrathin oxide layer thicknesses. The inventors also found that when the Fe-based amorphous thin strip has a three-layer structure with a segregated layer containing either or both P and S between an ultrathin oxide layer and an amorphous mother layer, even lower iron loss is achieved than with a ultrathin oxide layer alone. FIG. 3 shows the results obtained. These results are for an Fe—Si—B—C—(P,S) system containing P and S. In the case of an Fe—Si—B—C system, the iron loss is reduced as the thickness of the ultrathin oxide layer increases. The hysteresis loss is also reduced as the ultrathin oxide layer thickness increases. However, there is virtually no change in the eddy current loss. On the other hand, in the case of an Fe—Si—B—C—(P,S) system, the iron loss is reduced as the thickness of the ultrathin oxide layer increases, but lower iron loss is exhibited than with an Fe—Si—B—C system. Also, the hysteresis loss is reduced as the ultrathin oxide layer thickness increases, but it is reduced to a greater degree than with an Fe—Si—B—C system. The reduction in hysteresis loss is assumed to result from the segregated layer containing either or both P and S which is formed between the amorphous mother layer and the ultrathin oxide layer, creating a smooth interface between both and allowing easier movement of the magnetic domain wall. In an Fe—Si—B—C—(P,S) system, there is also a tendency for a reduction in eddy current loss as the ultrathin oxide layer thickness increases. This tendency closely matches the results of the above-mentioned magnetic domain observation.

The present inventors further investigated in detail the relationship between iron loss and thicknesses of ultrathin oxide layers and segregated layers containing either or both P and S between ultrathin oxide layers and amorphous mother layers in Fe—Si—B—C-based and Fe—Si—B—C—(P,S)-based amorphous alloy thin strips having different thicknesses. As a result it was found that an effect of reduced iron loss is achieved when the ultrathin oxide layer thickness is between 5 nm and 20 nm. No further effect of reduced iron loss was seen even when the ultrathin oxide layer thickness was greater than 20 nm. The thickness of the ultrathin oxide layer has therefore been limited to no greater than 20 nm. Also, no effect of reduced iron loss was found when the thickness of the ultrathin oxide layer was less than 5 nm. This is believed to be because, when the thickness of the ultrathin oxide layer is less than 5 nm, it becomes difficult to produce a uniform ultrathin oxide layer on the surface of the thin strip, and thus fragmentation of the magnetic domain does not occur. The thickness of the ultrathin oxide layer has therefore been limited to at least 5 nm. The mechanism of magnetic domain fragmentation is thought to occur due to the tension effect produced by the ultrathin oxide layer. An ultrathin oxide layer thickness in the range of 8 nm to 14 nm gives even more satisfactory iron loss, with an iron loss of 0.10 W/kg or less at W13/50. Since no effect of reduced iron loss was found when the segregated layer containing either or both P and S was at a thickness of less than 0.2 nm, the thickness of the segregated layer containing either or both P and S must be at least 0.2 nm. The segregated layer thickness is preferably from about 0.2 nm to 15 nm. This is because little reduction in iron loss can be expected even when the thickness exceeds 15 nm. In the case of a thin strip with a three-layer structure having a segregated layer containing either or both P and S, an effect of reduced iron loss is seen with an ultrathin oxide layer thickness of up to about 100 nm.

The ultrathin oxide layer need not be present on both sides of the thin strip, as an effect of reduced iron loss can be achieved so long as it is present on at least one side of the thin strip. However, it is preferred for the ultrathin oxide layer to be present at least on the side which is not in contact with the substrate, since this facilitates control of the ultrathin oxide layer during manufacture and since the side contacting with the substrate includes air pockets making it difficult to achieve a uniform ultrathin oxide layer.

The present inventors also investigated in detail how iron loss is affected by the oxygen concentration in the surrounding atmosphere during casting, the lift-off temperature of the thin strip during casting, and by structures of ultrathin oxide layers of thin strips fabricated with different types of added elements and added amounts under many different casting conditions. As a result, it was found that iron loss can be further reduced by increasing the oxygen concentration in the atmosphere during casting and increasing the lift-off temperature of the thin strip, whereby the oxide layer is not simply thickened but the structure of the oxide layer is altered to a two-layer structure. It was also found that iron loss can be still further reduced by segregating the Group V elements P, As, Sb and Bi and the Group VI elements S, Se and Te included in the thin strip in the oxide layer, on the side of the amorphous mother phase of the oxide layers in the two-layer structure; the present invention has been completed upon the basis of these findings.

Figure 6:
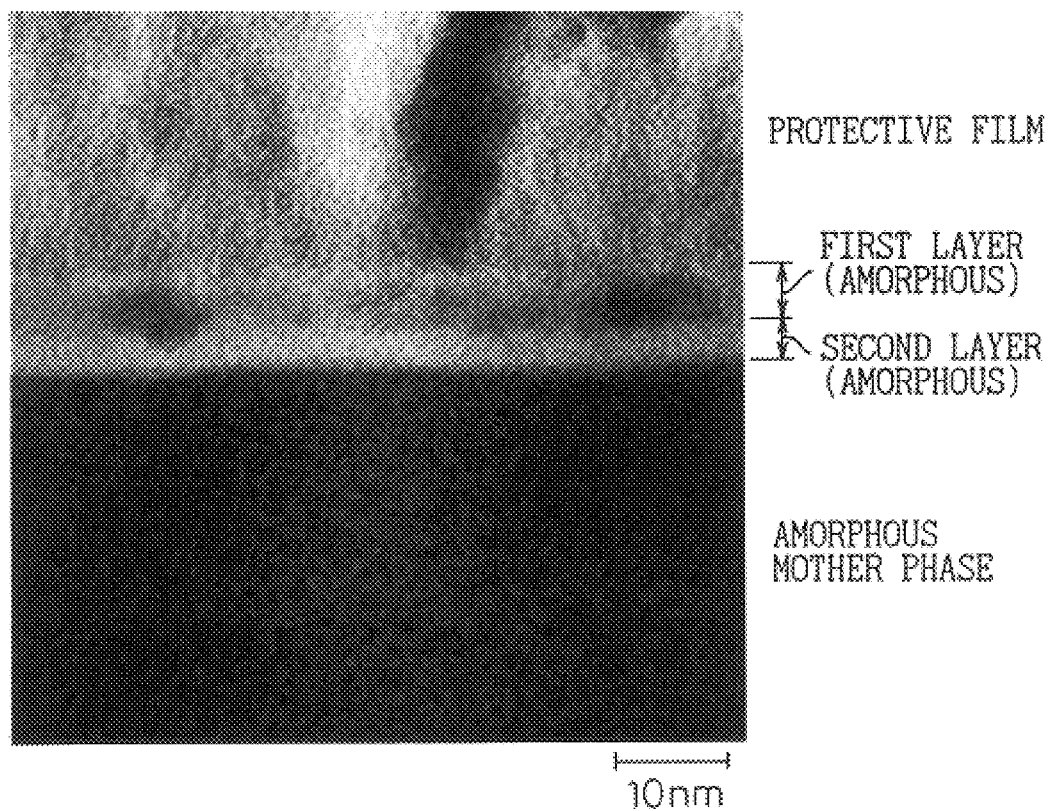
FIG. 6 is a cross-sectional TEM photograph showing the structure of an oxide layer (of the free side of a thin strip) (for a two-layer oxide layer structure where the first layer is amorphous and the second layer is also amorphous).

The Fe-based amorphous alloy thin strip of the invention has an ultrathin oxide layer on the surface of at least one side, and the ultrathin oxide layer has a two-layer structure. This will be readily appreciated from a cross-sectional TEM photograph of the thin strip. An example is seen in FIG. 6, which shows a cross-sectional TEM photograph of the free side of a thin strip cast while controlling the lift-off temperature of the thin strip in air using a mother alloy with a composition of $Fe_{80.5}Si_{2.5}B_{16}C_1$ by atomic percent, by the single roll method. The ultrathin oxide layer clearly has a two-layer structure. In this thin strip, a crystallized structure cannot be seen in the two-layer ultrathin oxide layer by TEM. Therefore, both layers are crystalline. Both are amorphous.

Figure 7:
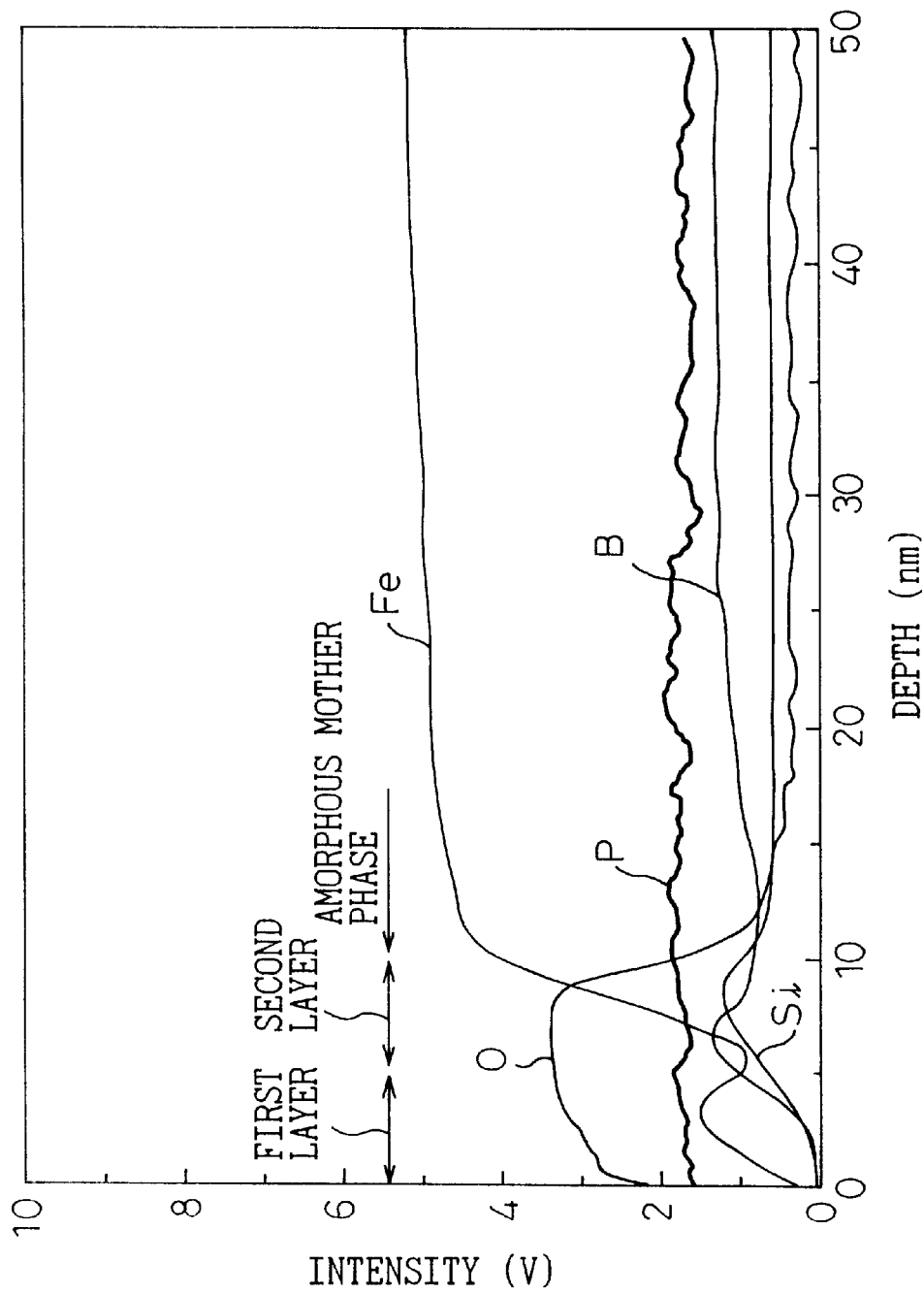
FIG. 7 is an elemental concentration profile for the free side of a thin strip according to GDS.

The ultrathin oxide layer with a two-layer structure in the Fe-based amorphous alloy thin strip of the invention is an Fe-based, Si-based or B-based oxide, or a composite oxide thereof. This will be readily understood from a GDS profile representing the elemental concentration distribution in the direction of depth from the thin strip surface. An example is seen in FIG. 7, which is a GDS profile from the free side of the thin strip used for FIG. 6. However, the sensitivity coefficient differs for each element during GDS measurement. Respective peaks for Fe, Si and B are seen in the range of oxygen peaks for the oxide layer of the thin strip. FIG. 7 also shows the profile for P, but it has no segregated layer.

When the TEM photograph and GDS profile are considered together, it can be seen that the first oxide layer (hereunder referred to as the "first layer") on the uppermost surface of the thin strip is a layer with abundant Fe and relatively little Si and B, whereas the second oxide layer (hereunder referred to as the "second layer") between the first layer and the amorphous mother phase is a layer with less Fe than the first layer, and relatively abundant Si and B.

Figure 8A:
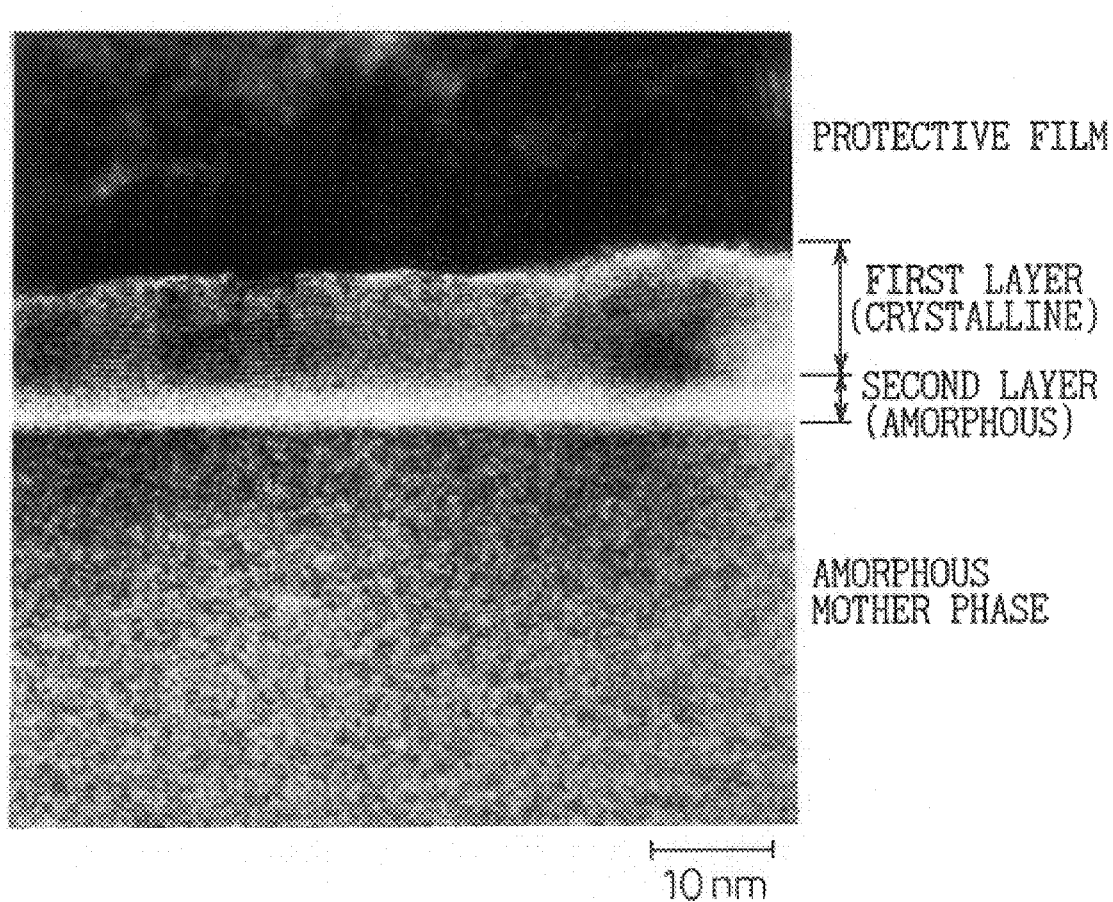
FIG. 8($a$) is a cross-sectional TEM photograph showing the structure of an oxide layer (of the free side of a thin strip) (of a two-layer oxide layer structure where the first layer is crystalline and the second layer is amorphous).
Figure 8B:
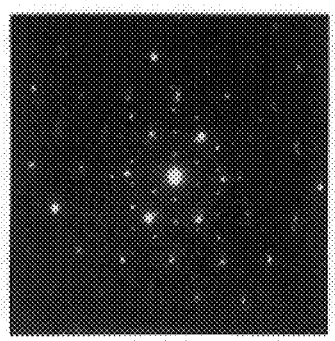

It is possible to alter the structure of the first layer by the casting conditions. As the Fe content of the first layer is increased, the first layer can proceed from an amorphous to an amorphous/crystalline mixed layer, and then to a crystalline substance by further crystallization. The effect of reduced iron loss is greater as crystallization of the first layer proceeds. FIG. 6 is a case where the first layer is amorphous. When crystallization proceeds, the crystalline substance produced in the oxide layer is an Fe-based oxide, with a spinel structure composed mainly of $Fe_3O_4$ or $\gamma$-$Fe_2O_3$. FIG. 8(a) shows a cross-sectional TEM photograph of an Fe-based amorphous alloy, having a crystalline first layer, where the single-roll method was used to cast a mother alloy with a composition of $Fe_{80.5}Si_{2.5}B_{16}C_1$ by atomic percent while controlling the oxygen concentration in the casting atmosphere. FIG. 8(b) is a diffraction pattern showing that the first layer is a crystalline substance with a spinel structure. The reason for crystallization of the first layer with increasing Fe content is assumed to be that the increasing Fe, which results in relatively less Si and B, makes it impossible to maintain an amorphous state, so that an Fe-based crystalline oxide is produced. Increasing the Fe content of the first layer can be accomplished by raising the oxygen concentration in the casting atmosphere, by raising the lift-off temperature of the thin strip during casting, or by adding the elements mentioned hereunder.

Unlike the first layer that can be converted from amorphous to crystalline by the casting conditions, the second layer does not depend on the casting conditions, and the state of the amorphous oxide does not change. This is attributed to the fact that the second layer contains more Si and B than the first layer.

The relationship between the ultrathin oxide layer with the two-layer structure and iron loss of the thin strip is such that the iron loss is reduced with a greater thickness of the entire oxide layer. This occurs because the ultrathin oxide layer creates tension on the thin strip, causing fragmentation of the magnetic domain and thus reducing the eddy current loss, and with a thicker oxide layer the tension on the thin strip increases, reducing the iron loss. AS the respective roles of the two layers of the ultrathin oxide layer, it is thought that the first layer on the surface side which is most susceptible to oxygen penetration expands first, creating tension, and that the second layer transmits that tension to the amorphous mother phase thus preventing the first layer from peeling from the amorphous mother phase. Thus, a thicker first layer results in greater reduction in iron loss. However, if the first layer is too thick with respect to the second layer, the effect of reduced iron loss will be lower. This is believed to be because too much tension is created, so that part of the oxide layer is released from the amorphous mother phase and tension is no longer prevented. In addition, iron loss tends to be reduced as the structure of the first layer changes from amorphous, to an amorphous/crystalline mixed layer, and then to crystalline. The reason for this is assumed to be that crystallization increases the rigidity and results in more powerful tension.

Figure 9:
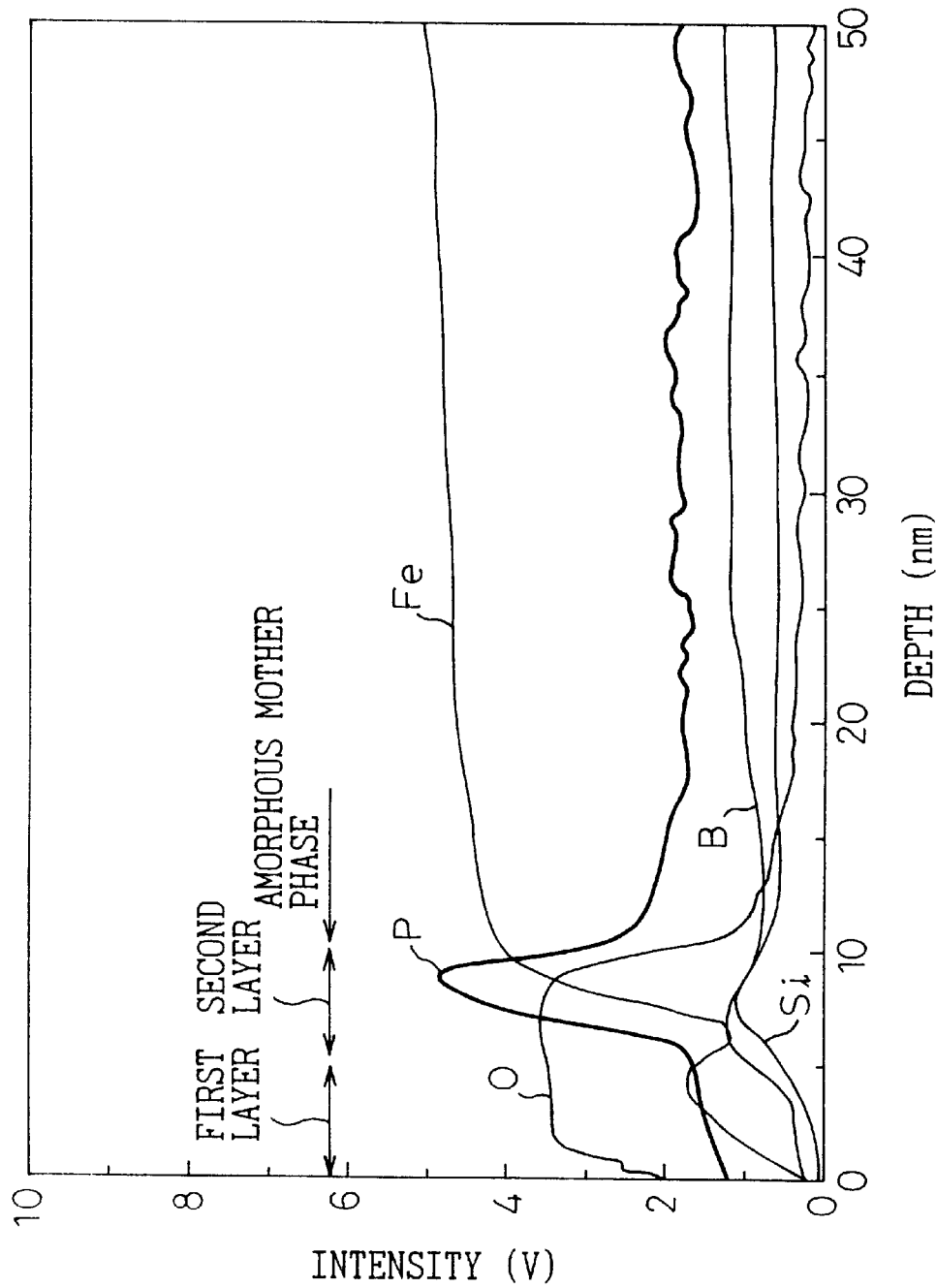
FIG. 9 is an elemental concentration profile of the free side of a thin strip (according to GDS).
Figure 10:
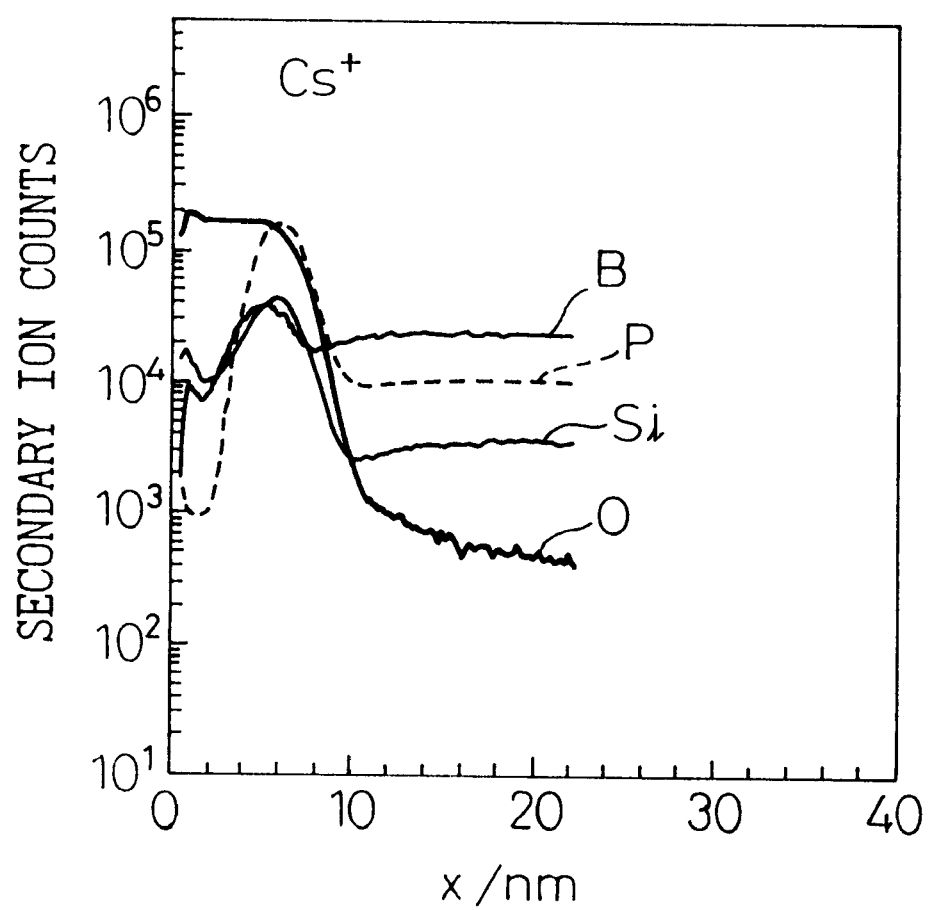
FIG. 10 is an elemental concentration profile for the free side of a thin strip (according to SIMS).

When one or more elements from among P, As, Sb, Bi, S, Se and Te are included, the elements are segregated in the second layer of the ultrathin oxide layer with a two-layer structure. The degree of segregation of the elements in the second layer can be varied by controlling the element contents, the thin strip lift-off temperature and the oxygen concentration of the casting atmosphere. This will become evident from the following profiles. FIGS. 9 and 10 show profiles by GDS and SIMS for the free sides of thin strips containing P. The oxide layer of each thin strip is in the form of two layers as shown in FIGS. 8(a) and 8(b), with the first layer a crystalline oxide. When the peak for P is compared with the peak for o representing the oxide layer in the GDS profile in FIG. 9, it is clear that P is segregated near the interface. between the oxide layer and the amorphous mother phase. The peak intensity for P in the high-resolution depth-directional SIMS profile shown in FIG. 10 falls from the outermost surface up to near 4 nm, and then increases sharply with greater depth reaching a peak at near 7 nm, and then dropping sharply at near 10 nm where the peak intensity for O decreases. Considering this fact in light of the two-layer structure of the oxide layer, it is clear that P is segregated in the second layer of the oxide layer with the two-layer structure.

The effect of the one or more elements from among P, As, Sb, Bi, S, Se and Te segregated in the second layer is to promote growth of the first layer and reduce eddy current loss of the thin strip. As concerns the mechanism thereof, the Fe ions in the oxide layer have a +2 valency or +3 valency, whereas the Group V elements P, As, Sb and Bi have a +5 valency and the Group VI elements S, Se and Te have a +6 valency, all of which are of greater valency than Fe. When these elements are substituted for Fe into the second layer of the ultrathin oxide layer, the charge balance is disturbed. Metal ion defects (Fe ion defects) consequently increase to alleviate this. When defects increase in the second layer, it is believed that metal ions (Fe ions) diffuse more abundantly into the first layer from the amorphous mother phase via the second layer, so that growth of the first layer is facilitated. The increased Fe content of the first layer also results in easier crystallization of the first layer, as explained above. Due to the thicker first layer of the oxide layer and its easier crystallization, tension on the thin strip is increased, fragmentation of the magnetic domain occurs, and eddy current loss is reduced. In addition, the one or more elements from among P, As, Sb, Bi, S, Se and Te also have an effect of reducing hysteresis loss. This effect is attributed to smoothing of the interface between the second layer and the amorphous mother phase, which facilitates movement of the magnetic domain wall.

The content of the one or more elements from among P, As, Sb, Bi, S, Se and Te in the thin strip is preferably a total of at least 0.0003 wt % and not more than 0.15 wt %. At less than 0.0003 wt % there is no effect, and at greater than 0.15 wt % the thin strip becomes brittle. Of these elements, P and S are particularly preferred for use because they are inexpensive. The content of the added elements in the thin strip can be easily analyzed by chemical analysis, etc.

The overall thickness of the ultrathin oxide layer is preferably from 5 nm to 20 nm. If the thickness of the ultrathin oxide layer is less than 5 nm it is sometimes difficult to achieve two layers in the oxide layer, and even if the ultrathin oxide layer thickness is greater than 20 nm no further iron loss-reducing effect is seen. As regards the thickness of each layer of the ultrathin oxide layer with a two-layer structure, the thickness of the first layer is preferably from 3 nm to 15 nm. At less than 3 nm the effect of reduced iron loss is not very notable, while there is no change in the effect of reduced iron loss even with a thickness of over 15 nm. The thickness of the second layer is preferably from 2 nm to 15 nm. At less than 2 nm the effect of reduced iron loss is not very notable, and with a thickness of over 15 nm a smaller amount of Fe penetrates through the second layer, thus resulting in a thinner first layer that produces the large tension and thereby lowering the effect of reduced iron loss. The thickness of the second layer is more preferably 10 nm or smaller.

The ultrathin oxide layer need not be present on both sides of the thin strip, as an effect of reduced iron loss can be achieved so long as it is present on at least one side of the thin strip. When the ultrathin oxide layer formed on both sides of the thin strip and the segregated layer are both removed by, for example, chemical etching or the like, there is no effect of reduced iron loss. A natural oxide film of about 2 nm is formed on the removed side, and this contributes no iron loss-reducing effect. However, if the oxide layer and segregated layer are removed from only side while the oxide layer and segregated layer on the other side are left, then an effect of reduced iron loss is exhibited, though not equal to the effect achieved with both sides. Because the side contacting with the substrate includes air pockets making it difficult to achieve a uniform ultrathin oxide layer, it is sufficient for the ultrathin oxide layer to be on at least the side which is not in contact with the substrate.

The preferred sheet thickness range for the thin strip according to the invention is from 10 µm to 100 µm. This is because, if the sheet thickness is less than 10 µm, it will be difficult to manufacture the thin strip in a stable manner while, if the sheet thickness exceeds 100 µm, it will not only be difficult to manufacture the thin strip in a stable manner, but the thin strip will also become brittle. The sheet thickness is more preferably from 10 µm to 70 µm for more stable casting of the thin strip. The thin strip width is not particularly restricted, but is preferably at least 20 mm.

A preferred composition for the thin strip according to the invention is $Fe_aSi_bB_cC_d$, where a, b, c and d are in terms of atomic percent and satisfy the following: $70 \leq a \leq 86$, $1 \leq b \leq 19$, $7 \leq c \leq 20$, $0.02 \leq d \leq 4$, $a+b+c+d=100$. In addition to the these main components, at least one element from among P, As, Sb, Bi, S, Se and Te are preferably present in a range of from 0.0003% to 0.15%, as explained above. Unavoidable impurities other than these added elements may also be present.

When using the thin strip as an iron core, the saturation magnetic flux density of the iron core must be a high value of at least 1.5 T or greater. This requires an Fe content of at least 70 atomic percent. However, if the Fe content exceeds 86 atomic percent, amorphous formation becomes difficult and satisfactory thin strip properties cannot be obtained. The range for Fe is therefore from 70 atomic percent to 86 atomic percent. Si and B serve to improve the amorphous formability and the thermal stability. When Si is less than 1 atomic percent and B is less than 7 atomic percent, amorphous formation cannot be stably achieved, and when Si is greater than 19 atomic percent or B is greater than 20 atomic percent, the materials cost is simply increased while no improvement in amorphous formability or thermal stability is realized. The preferred ranges are therefore from 1 atomic percent to 19 atomic percent for Si and from 7 atomic percent to 20 atomic percent for B. C is an element with an effect of improving the casting property of the thin strip. Adding C can improve the wettability between the molten metal and the substrate to form a satisfactory thin strip. No effect is achieved at less than 0.02 atomic percent. Also, no improvement in the effect is achieved even if the C content is greater than 4 atomic percent. The range for C is therefore from 0.02 atomic percent to 4 atomic percent. For even greater stability of the electromagnetic properties, the preferred ranges are from 77 to 83 atomic percent for Fe, from 2 to 9 atomic percent for Si and from 11 to 17 atomic percent for B. An even more particularly notable effect of reduced iron loss can be achieved by the ultrathin oxide layer in the ranges of from 80 to 82 atomic percent for Fe, from 2 to 5 atomic percent for Si, from 14 to 16 atomic percent for B and from 0.02 to 4 atomic percent for C.

The preferred ultrathin oxide layer is an Fe-based, Si-based or B-based oxide, or an ultrathin composite oxide thereof. It is believed that formation of these ultrathin oxides on thin strip surfaces at high temperatures above room temperature produce optimum tension in amorphous alloy thin strips. Among these, Fe-based and Si-based oxides are preferably used as the main components.

The thin strip of the invention can be fabricated from a molten alloy with a composition comprising at least one element from among P, As, Sb, Bi, S, Se and Te added to $Fe_{80.5}Si_{6.5}B_{12}C_1$ (atomic percent) or $Fe_{80.5}Si_{2.5}B_{16}C_1$ (atomic percent), for example, using a single-roll apparatus with an atmosphere-controllable chamber and controlling the oxygen concentration in the chamber. By control of the added element amounts and the oxygen concentration it is possible to create two layers in the ultrathin oxide layer and control the thickness of each oxide layer to within suitable ranges, to produce an amorphous alloy thin strip with reduced iron loss. A method can also be employed wherein the thin strip sheet thickness and lift-off temperature are controlled with an air casting apparatus. According to this method, the amount of added elements and the lift-off temperature are controlled to allow formation of two layers in the ultrathin oxide layer and to control the thickness of each oxide layer to within suitable ranges, for production of an amorphous alloy thin strip with reduced iron loss. Alternatively, it can also be fabricated by controlling the atmosphere near the paddle on the roll.

The thin strip of the invention can be manufactured not only with a single-roll apparatus but also with a twin-roll apparatus, a centrifugal quenching apparatus which employs the interior wall of a drum, or an apparatus which employs an endless belt.

The thickness and structure of the ultrathin oxide layer can be examined by TEM observation in the cross-sectional direction of the thin strip. The state of each element and the segregation of the added elements in the oxide layer can also be examined by the profile of each element in the direction of depth, as measured using a surface analyzing method such as GDS (Glow Discharge Emission Spectroscopy), SIMS or the like.

The present invention will now be explained in further detail by way of examples.

EXAMPLE 2

Figure 4:
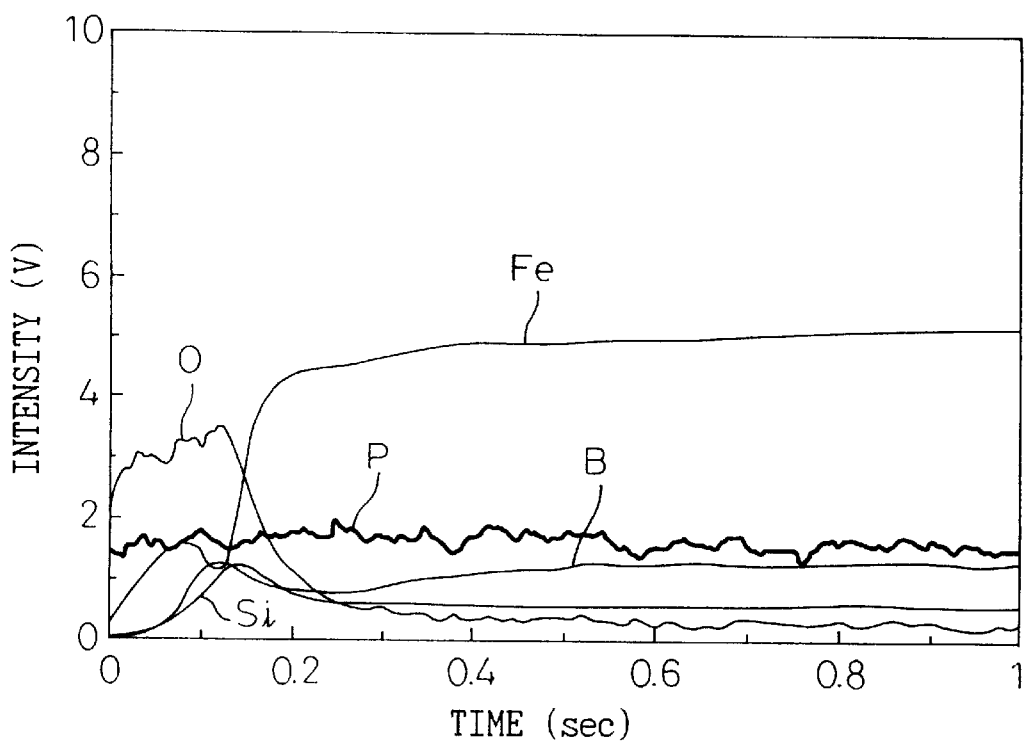
FIG. 4 is a graph showing an example of an elemental concentration profile by GDS (Glow-Discharge Emission Spectroscopy).

The mother alloy used was an alloy composition of $Fe_{80.5}Si_{5}B_{16}C_{1}$ by atomic percent. A single-roll apparatus with a Cu cooling roll having a 300-mm outer diameter was used on the mother alloy in an atmosphere-controllable chamber, gradually changing the oxygen concentration in the chamber to cast thin strips with various ultrathin oxide layer thicknesses. The width of each thin strip was 25 mm. The thickness of the ultrathin oxide layer was determined from the concentration profile for each element as obtained by GDS (Glow Discharge Emission Spectroscopy, sputtering rate: 50 nm/sec). An example is shown in FIG. 4. Observation of peaks for Fe, Si and B at positions overlapping with the oxygen peak confirms that the ultrathin oxide layer contains Fe-based, Si-based and B-based oxides.

After magnetic field annealing of the thin strips in a nitrogen atmosphere at 360° C. for one hour, the iron loss was measured with an SST (Single Strip Tester). The thickness of each ultrathin oxide layer was virtually unchanged before and after annealing. The results are shown in Table 1. As Table 1 shows, the W13/50 iron loss (iron loss at 1.3 T and 50 Hz) was 0.135 W/kg or greater with an ultrathin oxide layer thickness of less than 5 nm, but the iron loss was reduced with increasing ultrathin oxide layer thickness when the ultrathin oxide layer of at least one of the thin strip surfaces was over 5 nm, and an iron loss reduction of up to 0.10 W/kg was reached at near 10 nm. However, when the thickness of the ultrathin oxide layer was increased further the iron loss was greater and, at over 20 nm, the iron loss returned to 0.135 W/kg or greater. As these results demonstrate, an ultrathin oxide layer with a thickness of 5 nm to 20 nm has an effect of reducing iron loss.

No.2-a shown in Table 1 was prepared by masking the free side of thin strip No.2 and then etching it to remove the ultrathin oxide layer on the roll side. No.2-b was prepared by masking the roll side of thin strip No.2 and removing the ultrathin oxide layer on the free side. The iron losses of No.2, No.2-a and No.2-b were approximately equivalent. As these results clearly show, it is sufficient for the ultrathin oxide layer to be on at least one of the surfaces of the thin strip.

TABLE 1

| | | Thickness of ultrathin oxide layer-covered thin strip side and ultrathin oxide layer | | |
| --- | --- | --- | --- | --- |
| No. | Thin strip sheet thickness (μm) | Side not in contact with cooling substrate (free side) | Side in contact with cooling substrate (roll side) | W13/50 iron loss (W/kg) |
| Comp. Ex. No. 1 (Normal air casting conditions) | 26 | 4.2 | 3.9 | 0.135 |
| Example No. 2 | 25 | 5.2 | 5.1 | 0.128 |
| Example No. 2-a | 25 | 5.2 | 0 | 0.127 |
| Example No. 2-b | 25 | 0 | 5.1 | 0.130 |
| Example No. 3 | 27 | 6.3 | 6.2 | 0.120 |
| Example No. 4 | 27 | 7.0 | 6.8 | 0.106 |
| Example No. 5 | 26 | 8 3 | 8.2 | 0.098 |
| Example No. 6 | 28 | 10.1 | 8.9 | 0.092 |
| Example No. 7 | 30 | 13.5 | 13.5 | 0.100 |
| Example No. 8 | 31 | 15.4 | 16.2 | 0.112 |
| Example No. 9 | 33 | 19.5 | 19.2 | 0.130 |
| Comp. Ex. No. 10 | 28 | 21.0 | 19.8 | 0.136 |
| Comp. Ex. No. 11 | 25 | 23.3 | 21.7 | 0.139 |

EXAMPLE 2

Figure 5:
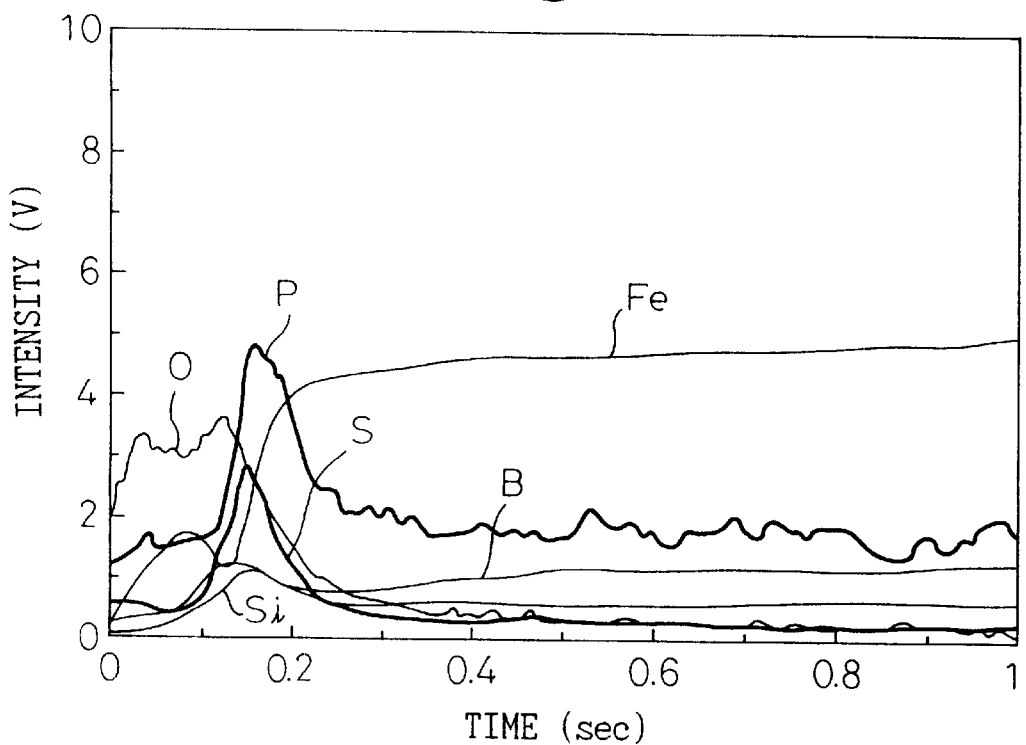
FIG. 5 is a graph showing an example of an elemental concentration profile by GDS for an amorphous alloy thin strip fabricated with addition of P and S to the mother alloy.

To a mother alloy prepared with the alloy composition $Fe_{80.5}Si_{2.5}B_{16}C_{1}$ by atomic percent used in Example 1 there was added P in the range of 0.01–0.05 wt % and S at 0.007 wt % either alone or in combination, and thin strips were cast in the same manner as Example 1. The thickness of the segregated layer was changed by varying the P content and the cooling rate of the thin strip. FIG. 5 shows an example of a concentration profile for each element in a thin strip by GDS, for a case were both P and S were added. FIG. 5 differs from the profile in FIG. 4, in that peaks for P and S are observed to the right of the oxygen peak (inward direction of the thin strip). This means that a segregated layer of P and S is present between the ultrathin oxide layer and the amorphous mother layer, constituting a three-layer structure. Furthermore, since peaks for Fe, Si and B are seen overlapping the oxygen peak, it is concluded that the ultrathin oxide layer contains Fe-based, Si-based and B-based oxides.

These thin strips were heat treated in the same manner as Example 1 and the iron loss was measured by SST. The results are shown in Table 2. The W13/50 iron loss was 0.135 W/kg or greater when the thickness of the P, S segregated layers was less than 0.2 nm, but a reduction in iron loss occurred with increasing P, S segregated layer thickness of 0.2 nm or greater. In a segregated layer thickness range of 4–12 nm a low iron loss of 0.10 W/kg or less was exhibited. The iron loss increased with any greater segregated layer thickness, but an iron loss of 0.135 W/kg or less was still exhibited up to about 15 nm. The thickness of the ultrathin oxide layer here was 26 nm, indicating that the range of ultrathin oxide layer thicknesses exhibiting low iron loss was wider than with an ultrathin oxide layer alone.

Thus, in a thin strip with a three-layer structure having a segregated layer of P and S between the ultrathin oxide layer and the amorphous mother layer, a segregated layer of P and S with a thickness of at least 0.2 nm clearly has an effect of reducing iron loss.

Furthermore, as in Example 1, No.25-a in Table 2 was prepared by masking the free side of thin strip No.25 and then etching it to remove the ultrathin oxide layer and the P and S segregated layer on the roll side, while No.25-b was prepared by masking the roll side of thin strip No.25 and removing the ultrathin oxide layer and P and S segregated layer on the free side. As shown by the results in Table 2, the iron losses of No.25, No.25-a and No.25-b were approximately equivalent, and therefore it is sufficient for the ultrathin oxide layer and segregated layer of P and S to be on at least one of the surfaces of the thin strip.

EXAMPLE 3

The same mother alloy of Example 1 and Example 2 was used to cast thin strips in air using a single-roll apparatus with a Cu cooling roll having a 600-mm outer diameter. Single and multiple slotted nozzles were used to fabricate thin strips with various sheet thicknesses. During the fabrication, the lift-off position for the thin strip on the Cu cooling roll was changed to vary the lift-off temperature of the thin strip, in order to control the thickness of the ultrathin oxide layer. The sheet width of each thin strip was 25 mm. The thickness of the ultrathin oxide layer and the P and S segregated layer of each resulting thin strip was examined by GDS. The results of GDS showed the ultrathin oxide layers to be oxide layers containing Fe-based, Si-based and B-based oxides. The thin strips were heat treated in the same manner as Example 1 and Example 2 and the iron loss was measured by SST. The results are shown in Table 3. As Table 3 shows, low iron loss at W13/50 of 0.135 W/kg or lower was obtained in a wide sheet thickness range of 10 $\mu$m to 100 $\mu$m, while thin strip No.41 fabricated for comparison had numerous holes over the entire thin strip, and thin strip No.51 was brittle and its stable fabrication was difficult.

TABLE 2

| | | Thickness of ultrathin oxide layer-covered think strip side and ultrathin oxide layer/P, S segregated layer | | | | | | |
|---|---|---|---|---|---|---|---|---|
| | | Side not in contact with cooling substrate (free side) | | | Side in contact with cooling substreate (roll side) | | | |
| No. | Thin strip sheet thickness ($\mu$m) | Ultrathin oxide layer | P, S segregated layer | Type of segregated layer | Ultrathin oxide layer | P, S segregated layer | Type of segregated layer | W13/50 loss (W/kg) |
| Comp. Ex. No. 21 | 24 | 3.8 | 0.1 | P | 3.7 | 0.1 | P | 0.141 |
| Example No. 22 | 27 | 4.0 | 0.2 | P, S | 3.9 | 0.1 | P, S | 0.134 |
| Example No. 23 | 27 | 4.5 | 1.0 | P, S | 4.3 | 0.6 | P, S | 0.128 |
| Example No. 24 | 25 | 5.B | 2.2 | P | 5.5 | 2.3 | P | 0.122 |
| Example No. 25 | 26 | 6.2 | 4.1 | P, S | 6.4 | 4.0 | P, S | 0.099 |
| Example No. 25-a | 26 | 6.2 | 4.1 | P, S | 0 | 0 | — | 0.098 |
| Example No. 25-b | 26 | 0 | 0 | — | 6.4 | 4.0 | P, S | 0.100 |
| Example No. 26 | 29 | 7 | 5.3 | S | 7.1 | 5.0 | S | 0.095 |
| Example No. 27 | 27 | 8.3 | 4.0 | P, S | 8 | 4.3 | P, S | 0.081 |
| Example No. 28 | 30 | 9 | 6.1 | P | 9.2 | 6.5 | P | 0.079 |
| Example No. 29 | 32 | 9.5 | 5.7 | P, S | 9.5 | s.4 | P, S | 0.069 |
| Example No. 30 | 28 | 12.1 | 8.4 | P, S | 12 | 8.0 | P, S | 0.086 |
| Example No. 31 | 27 | 18 | 12.1 | P | 17.8 | 12.5 | P | 0.108 |
| Example No. 32 | 29 | 26 | 14.9 | P, S | 26.5 | 15.0 | P, S | 0.121 |

TABLE 3

| No. | Thin strip sheet thickness (μm) | Ultrathin oxide layer thickness (nm) | P, S segregated layer Thickness (nm) | P, S segregated layer Type of segregated layer | W13/50 loss (W/kg) |
|---|---|---|---|---|---|
| Comp. Ex. No. 41 | 8 | 4.1 | — | — | 0.149 |
| Example No. 42 | 10 | 4.5 | 1.0 | P | 0.135 |
| Example No. 43 | 15 | 4.2 | 2.3 | P, S | 0.129 |
| Example No. 44 | 21 | 5.3 | — | — | 0.114 |
| Example No. 45 | 33 | 6.1 | 3.5 | S | 0.104 |
| Example No. 46 | 48 | 9.5 | 2.6 | P, S | 0.122 |
| Example No. 47 | 62 | 12.0 | 3.1 | P | 0.128 |
| Example No. 48 | 70 | 15.2 | — | — | 0.132 |
| Example No. 49 | 79 | 18.3 | 3.7 | P, S | 0.132 |
| Example No. 50 | 95 | 20.1 | 4.2 | P, S | 0.135 |
| Comp. Ex. No. 51 | 103 | 23.4 | 4.0 | P, S | 0.159 |

EXAMPLE 4

The mother alloy used was an alloy composition of $Fe_{80.5}Si_{2.5}B_{16}C_1$ by atomic percent. Thin strips were cast in air using a single-roll apparatus with a Cu cooling roll having a 600-mm outer diameter. During the casting, the lift-off position for the thin strip on the Cu cooling roll was changed to vary the lift-off temperature of the thin strip, in order to control the thickness and structure of the ultrathin oxide layer. The sheet thickness of each thin strip was about 25 μm, and the width of each thin strip was 25 mm. The composition of the resulting thin strip was examined by chemical analysis and confirmed to be essentially the target composition. After magnetic field annealing of the thin strips in a nitrogen atmosphere at 360° C. for one hour, an SST (Single Strip Tester) was used to measure the W13/50 iron loss at a magnetic flux density of 1.3 T and a frequency of 50 Hz. The thickness and structure of each ultrathin oxide layer was measured from the results of TEM observation in the cross-sectional direction of the thin strip, and the profile of each element in the direction of depth was examined using GDS and SIMS. The results are shown in FIG. 11.

Higher lift-off temperatures tended to result in thicker oxide layers, and lower iron loss. The oxide layer had a single-layer structure when the oxide layer thickness was smaller than 5 nm, but with an oxide layer thickness of 5 nm or greater the oxide layer had two layers. The first layer and second layer of the two-layer structured oxide layer were both amorphous. In FIG. 11, the oxide layer with a single-layer structure as a comparative example exhibited virtually no iron loss reduction corresponding to increased oxide layer thickness. In contrast, with the present invention examples which had two-layer oxide layers, there was a notable reduction in iron loss corresponding to increased oxide layer thickness. In other words, a two-layer oxide layer can be said to be more effective for reducing iron loss.

FIG. 6 shows a cross-sectional TEM image of an oxide layer on the free side of a thin strip where the lift-off temperature is 220° C., and FIG. 7 shows a GDS profile. From FIG. 6 it is seen that the oxide layer has two layers. In the GDS profile in FIG. 7, respective peaks are seen for Fe, Si and B within the range of the oxygen peak indicating the oxide layer. This indicates that the oxide layer consists of Fe-based, Si-based and B-based oxides or composite oxides thereof. When the TEM photograph and GDS profile are considered together, it is seen that the first layer is a layer with abundant Fe and relatively little Si and B, whereas the second layer is a layer with less Fe than the first layer, and relatively abundant Si and B.

EXAMPLE 5

The mother alloy used was an alloy composition of $Fe_{80.5}Si_{2.5}B_{16}C_1$ by atomic percent, as in Example 4. A single-roll apparatus with a Cu cooling roll having a 300-mm diameter was used on the mother alloy in an atmosphere-controllable chamber, gradually changing the oxygen concentration in the chamber to cast thin strips with various ultrathin oxide layer thicknesses. The sheet thickness of each thin strip was about 25 μm, and the width of each thin strip was 25 mm. The composition of each resulting thin strip was examined by chemical analysis and confirmed to be essentially the target composition. After magnetic field annealing of the thin strips in a nitrogen atmosphere at 360° C. for one hour, the W13/50 iron loss was measured with an SST (Single Strip Tester). The thickness and structure of each ultrathin oxide layer was measured from the results of TEM observation in the cross-sectional direction of the thin strip, and the profile of each element in the direction of depth was examined using GDS and SIMS. The method of evaluation was the same as in Example 4. The results are shown in Table 4.

TABLE 4

| Thin strip No. | Inv. Ex. or Comp. Ex. | Number of layers | Oxide layer structure | | Ultrathin oxide layer thickness (nm) | | | | | | W13/50 iron loss (W/kg) |
|---|---|---|---|---|---|---|---|---|---|---|---|
| | | | | | Side not in contact with cooling substrate (free side) | | | Side in contact with cooling substrate (roll side) | | | |
| | | | 1st layer | 2nd layer | Total thickness | 1st layer | 2nd layer | Total thickness | 1st layer | 2nd layer | |
| 1 | Comp. Ex. | 1 | amorphous | — | 4.2 | 4.2 | — | 3.9 | 3.9 | — | 0.135 |
| 2 | Inv. Ex. | 2 | amorphous | amorphous | 8.0 | 4.0 | 4.0 | 7.8 | 4.0 | 3.8 | 0.114 |
| 3 | Inv. Ex. | 2 | amorphous + crystalline | amorphous | 8.2 | 4.2 | 4.0 | 8 | 4.1 | 3.9 | 0.103 |
| 4 | Inv. Ex. | 2 | crystalline | amorphous | 8.2 | 4.4 | 3.8 | 8.1 | 4.4 | 3.9 | 0.095 |
| 5 | Inv. Ex. | 2 | crystalline | amorphous | 12.0 | 7.5 | 4.5 | 12.2 | 7.7 | 4.5 | 0.101 |
| 6 | Inv. Ex. | 2 | crystalline | amorphous | 18.0 | 11.2 | 6.8 | 18.2 | 11.4 | 6.8 | 0.111 |
| 7 | Inv. Ex. | 2 | crystalline | amorphous | 25.0 | 16.0 | 9.0 | 24.8 | 15.2 | 9.6 | 0.129 |

The present invention examples had oxide layers with two-layer structures, and exhibited good W13/50 iron loss values of 0.130 W/kg or lower. The thin strips with oxide layer thicknesses of from 5 nm to 20 nm exhibited particularly excellent values of 0.120 W/kg or lower. The results for thin strips No.2–No.4 indicate that iron loss decreased based on the oxide layer structure (first layer+second layer) in the order from amorphous+amorphous to (amorphous+crystalline)+amorphous, and further to crystalline+amorphous.

EXAMPLE 6

The mother alloy used was an alloy composition of $Fe_{80.5}Si_{2.5}B_{16}C_1$ by atomic percent, as in Example 4. A single-roll apparatus with a Cu cooling roll having a 600-mm outer diameter was used on the mother alloy which also contained P, As, Sb, Bi, S, Se and Te as added elements, for casting of thin strips in air. During the fabrication, the lift-off position for the thin strip on the Cu cooling roll was fixed, and the lift-off temperature of the thin strip was controlled to about 180° C. The sheet thickness of each thin strip was about 25 μm, and the width of each thin strip was 25 mm. Each resulting thin strip was examined by chemical analysis to confirm the contents of the added elements in each thin strip. After magnetic field annealing of the thin strips in a nitrogen atmosphere at 360° C. for one hour, the W13/50 iron loss was measured with an SST.(Single Strip Tester). The thickness and structure of each ultrathin oxide layer was measured from the results of TEM observation in the cross-sectional direction of the thin strip, and the profile of each element in the direction of depth was examined using GDS and SIMS to confirm the state of the segregated elements. The method of evaluation was the same as in Example 4. The results are shown in Table 5.

TABLE 5

| Thin strip No. | Inv. Ex. or Comp. Ex. | Added element content M: wt. % | Oxide layer structure | | | Ultrathin oxide layer thickness (nm) | | | | | | W13/50 iron loss (W/kg) |
|---|---|---|---|---|---|---|---|---|---|---|---|---|
| | | | | | | Side not in contact with cooling substrate (free side) | | | Side in contact with cooling substrate (roll side) | | | |
| | | | Number of layers | 1st layer | 2nd layer | Total thickness | 1st layer | 2nd layer | Total thickness | 1st layer | 2nd layer | |
| 11 | Inv. Ex. | none | 2 | amorphous | amorphous | 6.7 | 3.7 | 3.0 | 6.5 | 3.3 | 3.2 | 0.115 |
| 12 | Inv. Ex. | P: 0.03 | 2 | crystalline | amorphous | 8.5 | 4.5 | 4.0 | 8.3 | 4.3 | 4.0 | 0.085 |
| 13 | Inv. Ex. | As: 0.03 | 2 | crystalline | amorphous | 7.8 | 4.2 | 3.6 | 7.5 | 4.0 | 3.5 | 0.090 |
| 14 | Inv. Ex. | Sb: 0.03 | 2 | crystalline | amorphous | 7.9 | 4.6 | 3.3 | 7.6 | 4.4 | 3.2 | 0.092 |
| 15 | Inv. Ex. | Bi: 0.03 | 2 | crystalline | amorphous | 8.2 | 4.7 | 3.5 | 8.0 | 4.3 | 3.7 | 0.088 |
| 16 | Inv. Ex. | S: 0.03 | 2 | crystalline | amorphous | 9.0 | 5.0 | 4.0 | 8.7 | 4.8 | 3.9 | 0.083 |
| 17 | Inv. Ex. | Se: 0.03 | 2 | crystalline | amorphous | 8.5 | 4.6 | 3.9 | 8.3 | 4.6 | 3.7 | 0.086 |
| 18 | Inv. Ex. | Te: 0.03 | 2 | crystalline | amorphous | 8.6 | 4.5 | 4.1 | 8.4 | 4.5 | 3.9 | 0.090 |

Upon comparing the thin strips containing added elements (thin strips Nos.12–18) with the one without (thin strip No.11), it is seen that the thin strips with added elements had greater total thicknesses for the oxide layers, and the first layers were crystallized. The iron loss was also lower when added elements were included. The added elements therefore clearly have an effect of increasing the oxide layer thickness and crystallizing the first layer, thus resulting in a reduction in iron loss. It was confirmed by GDS and SIMS that the segregated elements were all segregated in the second layer.

EXAMPLE 7

The mother alloy used was an alloy composition of $Fe_{80.5}Si_{2.5}B_{16}C_1$ by atomic percent, as in Example 4. A single-roll apparatus with a Cu cooling roll having a 300-mm diameter was used in an atmosphere-controllable chamber on the mother alloy to which P and S had been added, and the oxygen concentration in the chamber was gradually varied to cast thin strips with various ultrathin oxide layer thicknesses. The sheet thickness of each thin strip was about 25 μm, and the width of each thin strip was 25 mm. The contents of the added elements in each thin strip were examined by chemical analysis. After magnetic field annealing of the thin strips in a nitrogen atmosphere at 360° C. for one hour, the W13/50 iron loss was measured with an SST (Single Strip Tester). The thickness and structure of each ultrathin oxide layer was measured from the results of TEM observation in the cross-sectional direction of the thin strip, and the segregated state of the added elements was confirmed from the profile of each element in the direction of depth as measured using GDS and SIMS. The method of evaluation was the same as in Example 4. The results are shown in Table 6.

element content of the thin strip exceeds 0.15 wt % as in thin strip Nos.29–30, the resulting thin strip is often brittle. It was confirmed by GDS and SIMS that the segregated elements were all segregated in the second layer.

EXAMPLE 8

The thin strips obtained in Example 5 and Example 7 were subjected to etching to remove the surface layers and to examine the resulting effect. The annealed thin strips were subjected to chemical etching on one or both sides to remove the surface oxide layers. When only one side was removed, the other side was masked during the etching. The etching removal was about 0.2 μm per side. The iron loss was then evaluated with an SST, the thickness and structure of the

TABLE 6

| Thin strip No. | Added element Inv. Ex. or Comp. Ex. content M: wt. % | Oxide layer structure | | | Ultrathin oxide layer thickness (nm) | | |
|---|---|---|---|---|---|---|---|
| | | | | | Side not in contact with cooling substrate (free side) | | |
| | | Number of layers | 1st layer | 2nd layer | Total thickness | 1st layer | 2nd layer |
| 21 | Comp. Ex. P: 0.0001 | 1 | amorphous | — | 4.3 | 4.3 | — |
| 22 | Inv. Ex. P: 0.02 | 2 | amorphous | amorphous | 6.5 | 4.4 | 2.1 |
| 23 | Inv. Ex. S: 0.02 | 2 | amorphous | amorphous | 7.2 | 4.8 | 2.4 |
| 24 | Inv. Ex. P: 0.05 | 2 | crystalline | amorphous | 9.5 | 5.5 | 4.0 |
| 25 | Inv. Ex. S: 0.03 | 2 | crystalline | amorphous | 10.7 | 6.5 | 4.2 |
| 26 | Inv. Ex. P: 0.10 | 2 | crystalline | amorphous | 14.5 | 9.8 | 4.7 |
| 27 | Inv. Ex. S: 0.10 | 2 | crystalline | amorphous | 16.5 | 10.2 | 6.3 |
| 28 | Inv. Ex. P: 0.12 | 2 | crystalline | amorphous | 18.5 | 12.2 | 6.3 |
| 29 | Inv. Ex. P: 0.16 | 2 | crystalline | amorphous | 25.0 | 14.2 | 10.8 |
| 30 | Inv. Ex. S: 0.16 | 2 | crystalline | amorphous | 30.0 | 18.2 | 11.8 |

| Thin strip No. | Ultrathin oxide layer thickness (nm) Side in contact with cooling substrate (roll side) | | | W13/50 iron loss (W/kg) | Remarks |
|---|---|---|---|---|---|
| | Total thickness | 1st layer | 2nd layer | | |
| 21 | 3.9 | 3.9 | — | 0.137 | |
| 22 | 6.7 | 4.3 | 2.4 | 0.105 | |
| 23 | 7.5 | 4.7 | 2.7 | 0.090 | |
| 24 | 9.7 | 5.6 | 4.1 | 0.075 | |
| 25 | 11.0 | 6.8 | 4.2 | 0.071 | |
| 26 | 14.3 | 9.4 | 3.9 | 0.088 | |
| 27 | 16.8 | 10.5 | 6.3 | 0.101 | |
| 28 | 18.3 | 12.0 | 6.3 | 0.115 | |
| 29 | 24.8 | 14.2 | 10.6 | 0.125 | contacted bending not possible |
| 30 | 28.8 | 18.0 | 10.8 | 0.126 | contacted bending not possible |

The thin strips of the invention exhibited good w13/50 iron loss values of 0.130 W/kg or lower. The thin strips with oxide layer thicknesses of from 5 nm to 20 nm exhibited particularly excellent W13/50 iron loss values of 0.120 W/kg or lower. In the thin strip with an added element content of less than 0.0003 wt %, the oxide layer was not thickened and had a single-layer structure, and the W13/50 iron loss was poor at over 0.130 W/kg. Also, when the added ultrathin oxide layer was measured from the results of TEM observation in the cross-sectional direction of the thin strip, and the segregated state of the added elements was confirmed from the profile of each element in the direction of depth as measured using GDS and SIMS. The method of evaluation was the same as in Example 4. The results are shown in Table 7.

TABLE 7

| Thin strip No. | Inv. Ex. or Comp. Ex. | Added element content M: wt. % | Etched side | Oxide layer structure | | | Ultrathin oxide layer thickness (nm) | | | | | | W13/50 iron loss (W/kg) |
| | | | | Number of layers | 1st layer | 2nd layer | Side not in contact with cooling substrate (free side) | | | Side in contact with cooling substrate (roll side) | | | |
| | | | | | | | Total thickness | 1st layer | 2nd layer | Total thickness | 1st layer | 2nd layer | |
|---|---|---|---|---|---|---|---|---|---|---|---|---|---|
| 2 | Inv. Ex. | none | none | 2 | amorphous | amorphous | 8.0 | 4.0 | 4.0 | 7.8 | 4.0 | 3.8 | 0.114 |
| 2-a | Inv. Ex. | none | roll side | 2 | amorphous | amorphous | 8.0 | 4.0 | 4.0 | 2.0 | 2.0 | — | 0.118 |
| 2-b | Inv. Ex. | none | free side | 2 | amorphous | amorphous | 2.0 | 2.0 | — | 8.1 | 4.1 | 4.0 | 0.120 |
| 2-c | Comp. Ex. | none | both sides | 1 | amorphous | — | 2.1 | 2.1 | — | 2.1 | 2.1 | — | 0.142 |
| 24 | Inv. Ex. | P: 0.05 | none | 2 | crystalline | amorphous | 9.5 | 5.5 | 4.0 | 9.7 | 5.6 | 4.1 | 0.075 |
| 24-a | Inv. Ex. | P: 0.05 | roll side | 2 | crystalline | amorphous | 9.5 | 5.5 | 4.0 | 2.2 | 2.2 | — | 0.082 |
| 24-b | Inv. Ex. | P: 0.05 | free side | 2 | crystalline | amorphous | 2.2 | 2.2 | — | 9.6 | 5.5 | 4.1 | 0.088 |
| 24-c | Comp. Ex. | P: 0.05 | both sides | 1 | crystalline | amorphous | 2.3 | 2.3 | — | 2.4 | 2.4 | — | 0.140 |

As seen from thin strips No.2-c and No.24-c, when both sides were etched to remove the ultrathin oxide layers, a natural oxide layer was formed to about 2 nm after etching, but the W13/50 iron loss was a poor value on the order of 0.140 W/kg. In other words, it may be concluded that a natural oxide layer of about 2 nm does not contribute to reduced iron loss. In contrast, when an ultrathin oxide layer was present on either the free side or roll side, a satisfactory W13/50 value of 0.120 W/kg or lower was obtained, though this was not equivalent to having it on both sides. It is therefore clearly adequate for the ultrathin oxide layer to be present on at least one side. When the free side and the roll side are compared, a superior value was exhibited when the ultrathin oxide layer was on the free side.

EXAMPLE 9

A single-roll apparatus with a Cu cooling roll having a 600-mm outer diameter was used on the same starting material as in Example 4, for fabrication of thin strips in air. Single and multiple slotted nozzles were used to fabricate thin strips with various sheet thicknesses. During the casting, the lift-off position for the thin strip on the Cu cooling roll was changed to vary the lift-off temperature of the thin strip, in order to control the thickness and structure of the ultrathin oxide layer. The sheet width of each thin strip was 25 mm. The contents of the added elements in each thin strip were examined by chemical analysis. After subsequent magnetic field annealing of the thin strips in a nitrogen atmosphere at 360° C. for one hour, the iron loss was measured with an SST (Single Strip Tester). The thickness and structure of each ultrathin oxide layer was measured from the results of TEM observation in the cross-sectional direction of the thin strip, the profile of each element in the direction of depth was measured using GDS and SIMS to confirm the state of each element in the oxide layer. The method of evaluation was the same as in Example 4. The results are shown in Table 8.

TABLE 8

| Thin strip No. | Inv. Ex. or Comp. Ex. | Thin strip sheet thickness (μm) | Added element content M: wt. % | Oxide layer structure | | | Ultrathin oxide layer thickness (nm) | | |
| | | | | | | | Side not in contact with cooling substrate (free side) | | |
| | | | | Number of layers | 1st layer | 2nd layer | Total thickness | 1st layer | 2nd layer |
|---|---|---|---|---|---|---|---|---|---|
| 31 | Comp. Ex. | 8 | none | 1 | amorphous | — | 3.5 | 3.5 | — |
| 32 | Inv. Ex. | 18 | P: 0.05 | 2 | amorphous | amorphous | 6.3 | 4.1 | 2.2 |
| 33 | Inv. Ex. | 23 | S: 0.02 | 2 | amorphous | amorphous | 8.7 | 4.4 | 4.3 |
| 34 | Inv. Ex. | 26 | none | 2 | amorphous + crystalline | amorphous | 9.0 | 4.9 | 4.1 |
| 35 | Inv. Ex. | 28 | P: 0.05 | 2 | crystalline | amorphous | 10.5 | 6.2 | 4.3 |
| 36 | Inv. Ex. | 30 | none | 2 | crystalline | amorphous | 9.0 | 5.3 | 3.7 |
| 37 | Inv. Ex. | 40 | P: 0.05, S: 0.02 | 2 | crystalline | amorphous | 9.5 | 5.2 | 4.3 |
| 38 | Inv. Ex. | 60 | S: 0.02 | 2 | crystalline | amorphous | 12.0 | 7.2 | 4.8 |
| 39 | Inv. Ex. | 82 | P: 0.05 | 2 | crystalline | amorphous | 14.6 | 9.5 | 5.1 |

TABLE 8-continued

| | | | | | | | | | |
|---|---|---|---|---|---|---|---|---|---|
| 40 | Inv. Ex. | 95 | none | 2 | crystalline | amorphous | 17.3 | 10.5 | 6.8 |
| 41 | Inv. Ex. | 105 | none | 2 | crystalline | amorphous | 22.0 | 12.2 | 9.8 |

| | Ultrathin oxide layer thickness (nm) | | | | |
|---|---|---|---|---|---|
| | | Side in contact with | | | |
| | Thin | cooling substrate (roll side) | | | |
| | strip | Total | | | W13/50 iron |
| | No. | thickness | 1st layer | 2nd layer | loss (W/kg) | Remarks |
| | 31 | 3.6 | 3.6 | — | 0.138 | numerous holes |
| | 32 | 6.5 | 4.2 | 2.3 | 0.112 | |
| | 33 | 8.5 | 4.3 | 4.2 | 0.102 | |
| | 34 | 9.5 | 5.2 | 4.4 | 0.095 | |
| | 35 | 10.2 | 6.2 | 4.0 | 0.075 | |
| | 36 | 8.8 | 4.7 | 4.1 | 0.090 | |
| | 37 | 9.2 | 5.0 | 4.2 | 0.105 | |
| | 38 | 12.5 | 7.3 | 5.2 | 0.108 | |
| | 39 | 14.3 | 9.5 | 4.8 | 0.112 | |
| | 40 | 17.8 | 10.3 | 7.2 | 0.115 | |
| | 41 | 22.1 | 12.0 | 10.1 | 0.124 | Stable fabrication not possible |

The thin strips with a two-layer structure for the ultrathin oxide layer on the thin strip surface exhibited good W13/50 iron loss values of 0.130 W/kg or lower. The thin strips with total oxide layer thicknesses of from 5 nm to 20 nm exhibited particularly excellent W13/50 iron loss values of 0.120 W/kg or lower. Stable fabrication of thin strips with excellent W13/50 iron loss values of 0.120 W/kg or lower was possible in a wide sheet thickness range of 10 μm to 100 μm. Thin strip No.31 with a sheet thickness of 8 μm had numerous holes over the entire thin strip, and stable fabrication was difficult with thin strip No.41 which had a sheet thickness of 105 μm. When added elements M were included, it was confirmed by GDS and SIMS that the added elements were all segregated in the second layer.

As explained above, with low iron-loss Fe-based amorphous alloy thin strips having ultrathin oxide layers according to the invention, or low iron-loss Fe-based amorphous alloy thin strips having segregated layers including either or both P and S at the lower section of an ultrathin oxide layer with controlled thickness, it is possible to improve the characteristic variability of low iron-loss thin strips, to facilitate their stable fabrication, and to provide transformers with reduced iron loss by using Fe-based amorphous alloy thin strips with ultrathin oxide layers having a two-layer structure, produced by controlling the structure of the ultrathin oxide layers on the thin strip surfaces, as iron core materials for power transformers and the like.

What is claimed is:

1. An Fe-based amorphous alloy thin strip characterized by being a quenched metal thin strip obtained by ejecting a molten metal onto a moving substrate through a casting nozzle with a slot-shaped opening and quenching it to solidity and by having an ultrathin oxide layer on at least one surface of the thin strip, and by having a segregated layer containing either or both P and S at the lower section of said oxide layer.

2. An Fe-based amorphous alloy thin strip characterized by being a quenched metal thin strip obtained by ejecting a molten metal onto a moving substrate through a casting nozzle with a slot-shaped opening and quenching it to solidity and by having an ultrathin oxide layer on at least one surface of the thin strip, and in that the ultrathin oxide layer has a two-layer structure.

3. An Fe-based amorphous alloy thin strip according to claim 1, characterized in that the thickness of the segregated layer containing either or both P and S is 0.2 nm or greater.

4. An Fe-based amorphous alloy thin strip according to claim 2, characterized in that the two layers of the ultrathin oxide layer with the two-layer structure are both amorphous oxide layers.

5. An Fe-based amorphous alloy thin strip according to claim 2, characterized in that the first oxide layer on the outermost surface of the thin strip in the ultrathin oxide layer with the two-layer structure is a crystalline oxide and amorphous oxide mixed layer, and the second oxide layer between the first oxide layer and the amorphous mother phase is an amorphous oxide layer.

6. An Fe-based amorphous alloy thin strip according to claim 2, characterized in that the first oxide layer on the outermost surface of the thin strip in the ultrathin oxide layer with the two-layer structure is a crystalline oxide layer, and the second oxide layer between the first oxide layer and the amorphous mother phase is an amorphous oxide layer.

7. An Fe-based amorphous alloy thin strip according to claim 5, characterized in that the crystalline oxide composing the ultrathin oxide layer is an Fe-based oxide with a spinel structure.

8. An Fe-based amorphous alloy thin strip according to claim 2, characterized in that the total thickness of the ultrathin oxide layer with the two-layer structure is from 5 nm to 20 nm, the thickness of the first oxide layer on the uppermost surface of the thin strip is from 3 nm to 15 nm, and the thickness of the second oxide layer between the first oxide layer and the amorphous mother phase is from 2 nm to 10 nm.

9. An Fe-based amorphous alloy thin strip according to claim 2, characterized in that at least one element from among P, As, Sb, Bi, S, Se and Te is segregated in the second oxide layer.

10. An Fe-based amorphous alloy thin strip according to claim 9, characterized in that at least one element from among P, As, Sb, Bi, S, Se and Te is present in the thin strip at a total content of from 0.0003% to 0.15% by weight.

* * * * *